(12) United States Patent
O'Brien

(10) Patent No.: US 7,287,489 B1
(45) Date of Patent: Oct. 30, 2007

(54) PET DETERRENT DEVICE

(76) Inventor: John P. O'Brien, 3201 Hickory Ct., Bedford, TX (US) 76021

( * ) Notice: Subject to any disclaimer, the term of this patent is extended or adjusted under 35 U.S.C. 154(b) by 0 days.

(21) Appl. No.: 10/980,543

(22) Filed: Nov. 3, 2004

Related U.S. Application Data

(60) Provisional application No. 60/523,485, filed on Nov. 19, 2003.

(51) Int. Cl.
*A01K 29/00* (2006.01)

(52) U.S. Cl. .................................................. 119/712

(58) Field of Classification Search ............... 119/712, 119/428; 428/377; 424/402, 405, 409, 410, 424/411
See application file for complete search history.

(56) References Cited

U.S. PATENT DOCUMENTS

| | | |
|---|---|---|
| 1,149,170 A | 8/1915 | Allis |
| 1,977,775 A | 10/1934 | Patterson |
| 2,610,851 A | 9/1952 | Jones |
| 3,104,648 A | 9/1963 | Fisher |
| 3,871,334 A | 3/1975 | Axelrod |
| 3,878,444 A | 4/1975 | Miller |
| 4,171,463 A | 10/1979 | Watkins |
| 4,190,734 A | 2/1980 | Dressler, Jr. |
| 4,309,072 A | 1/1982 | Tweeddale |
| 4,505,541 A | 3/1985 | Considine et al. |
| 4,513,014 A | 4/1985 | Edwards |
| 4,514,035 A | 4/1985 | Steinmann et al. |
| 4,542,162 A * | 9/1985 | Rutherford et al. ............ 521/79 |
| 4,557,560 A | 12/1985 | Bohannon, Jr. et al. |
| 4,674,444 A | 6/1987 | Axelrod |
| 4,766,662 A | 8/1988 | Bradshaw et al. |
| 4,771,733 A | 9/1988 | Axelrod |
| 4,874,219 A | 10/1989 | Arroyo et al. |
| 4,938,560 A | 7/1990 | Arroyo et al. |
| 5,100,651 A | 3/1992 | Boyer |
| 5,339,771 A | 8/1994 | Axelrod |
| 5,364,626 A | 11/1994 | Hasegawa et al. |
| 5,464,625 A | 11/1995 | Nolte et al. |

(Continued)

FOREIGN PATENT DOCUMENTS

JP 09205975 A * 8/1997

(Continued)

OTHER PUBLICATIONS

Spiral Cable Wrap; http://www.frostytech.com/articleview.cfm?articleID=1290; Copyright 1999-2006.*

(Continued)

*Primary Examiner*—Thomas Price
(74) *Attorney, Agent, or Firm*—Law Office of J.D. Pemberton; John Pemberton

(57) ABSTRACT

A pet deterrent device is herein disclosed wherein common household pets may be trained away from the negative habit of chewing on various household items. The pet deterrent device generally comprises an absorbent substrate having a non-toxic, foul tasting substance impregnated therein which is adapted to be easily applied to any household item including electrical power cords, family heirlooms, furniture, and the like. Suitable absorbent substrates include various fabric materials and thermoplastic compositions such as polyurethane. Upon biting a typical household item/pet deterrent device assembly, the pet receives a foul taste thereby providing immediate negative reinforcement and thus training the pet away from the negative chewing behavior.

18 Claims, 2 Drawing Sheets

U.S. PATENT DOCUMENTS

| | | | |
|---|---|---|---|
| 5,741,553 A * | 4/1998 | Manolas et al. ............ 119/712 |
| 5,993,966 A | 11/1999 | Johnson |
| 6,200,616 B1 | 3/2001 | Axelrod et al. |
| 6,226,933 B1 | 5/2001 | Nelson et al. |
| 6,247,211 B1 * | 6/2001 | Bell ............................ 604/179 |
| 6,337,080 B1 * | 1/2002 | Fryan et al. ................ 424/409 |
| 6,379,725 B1 | 4/2002 | Wang et al. |
| 6,455,083 B1 | 9/2002 | Wang |
| 6,576,246 B1 | 6/2003 | Denesuk et al. |
| 6,797,350 B2 * | 9/2004 | Schumacher et al. ...... 428/40.1 |
| 2002/0108706 A1 * | 8/2002 | Roth et al. .................. 156/252 |
| 2002/0110576 A1 * | 8/2002 | Messina ..................... 424/411 |
| 2003/0010528 A1 | 1/2003 | Niles |

FOREIGN PATENT DOCUMENTS

WO      WO96/28113     *   9/1996

OTHER PUBLICATIONS http://www.ashleyfood.com/acatalog/Million_Scoville_pepper_Extract.html—ashley food.com, 1 Million Scoville Extract, printed Oct. 21, 2004.

http://www.halfbakery.com/idea/Chili_20pepper_20tape "Chili Pepper Tape", printed Sep. 21, 2005.

* cited by examiner

PET DETERRENT DEVICE

CROSS-REFERENCE TO RELATED APPLICATIONS

This application claims priority under 35 U.S.C. 119(e) on U.S. Provisional application No. 60/523,485 entitled PET DETERRENT DEVICE, filed on Nov. 19, 2003, by John P. O'Brien.

FIELD OF THE INVENTION

This invention relates to pet devices, and more particularly, to a system for training pets away from the negative behavioral pattern of chewing on various household items.

BACKGROUND OF THE PRIOR ART

Many people own pets today due to the enjoyment they provide via companionship as well as to perform useful tasks for their owners. For instance, dogs which are a very common type of pet can be trained to aid the hearing or sight impaired, retrieve game for hunters, or even perform trivial tricks for the amusement of people. Nevertheless, trained dogs do not instinctively perform these tasks; they must be trained repetitiously starting at as early an age as possible in order that these tasks become part of the dog's overall behavior pattern. Although it may be beneficial to train dogs into positive behavioral patterns such as performing tasks for their owners, in many cases it is also necessary to train them away from negative behavioral patterns such as improper defecation or urination, biting, over aggressiveness, or chewing on household items around a home.

Since pets such as dogs are many times allowed free access to the inside of a home, breaking the negative habit of chewing household items is paramount. This is due to the fact that irreparable damage can be done by the chewing action of the dog on costly household items such as furniture, sentimental heirlooms, electrical power cords, and the like. Moreover, electrical power cords which once chewed, can become very dangerous for all inhabitants of the household. The protective insulative barrier for the cord can become frayed due to the chewing action thus exposing the conductive wires therein to the ambient environment resulting in a severe safety hazard. The possible ramifications of this type of safety hazard include electrocution or mouth-burns of the pet; or even worse, electrocution of the owner or other human household inhabitants such as a child.

There have been chemical formulations as well as various herbal extracts that have been developed to train pets away from the negative behavior of chewing, however the vehicle used to transfer the chemical formulation or herbal extract to the item to be protected has heretofore only been provided been in amorphous liquid or granular form. Herbal formulations popular for their pet deterring effects include a substance derived from the bitter cucumber plant (*citrullus colocynthis*) commonly known by the trade name of 'bitter apple' and capsaicin pepper (*oleoresin capsicum*) which is extracted from chili peppers. Other examples of chemical formulations or herbal extracts known for their pet deterring effects include methyl nonyl ketone, napthalene, nicotene, ropel, thiram, oil of mustard, oil of anise, thymoil, and peppermint oil. A very important property of all these substances is that they are non-toxic which makes them suitable for indoor use on house pets. In addition, U.S. Pat. No. 5,364,626 to Hasegawa, et al. discloses a plurality of chemical agents to be admixed to various non-toxic repellent formulas in order to create a repellent having sustained release. Throughout the remainder of this document, all of the aforementioned chemical formulations and herbal extracts will be hereinafter referred to as pet repellents due to their similar utilitarian purpose. Nevertheless, since all of the aforementioned devices are only available in liquid or granular form, they must be applied directly to household items using spray bottles, spreaders or the like. This form of chemical application causes several salient problems. First, the outer coatings of many types of furniture are at least partially absorbent to chemicals such as water or various types of oils, thus application directly to the surface thereof could cause permanent discoloring or staining of the furniture piece. Secondly, the adhesive qualities of the chemical or herbal extract to the household item to be protected are relatively low and cannot be inherently controlled. Therefore, the serviceable life of each application of repellent is not so much a factor of the effective life of the repellent, but rather is determined by the propellant's ability to remain adhereingly attached to the household item's surface. Moreover, the repellent which ultimately flakes off the household item falls to the floor, thus possibly causing stains thereon as well.

Several devices have been developed for the protection of cables from unwanted rodents or other animals using chemical repellents. U.S. Pat. No. 4,171,463 to Watkins discloses a cable encasing structure having a lithium chloride gel substance disposed therein and U.S. Pat. No. 5,993,966 to Johnson discloses a repellent impregnated fibrous cord adapted to be wrapped around a cable prior to insertion into the ground for protection against rodent attack. However, both of these devices disclose the use of toxic chemical repellent agents which is clearly unsuitable for indoor use in close proximity to pets and children.

Thus, there has been a long-felt need for a pet deterrent device for the protection of household items such as electrical power cables, furniture, family heirlooms, and the like from pets having a disposition to chew thereon. The device should not cause the creation of stains or any permanent damage to furniture or any surrounding objects and should provide a long serviceable life. Most importantly, the device should be non-toxic in order to enable its use indoors within a home.

SUMMARY OF THE INVENTION AND OBJECTIVES

The present invention provides a solution to these and other needs via a pet deterrent device comprising an absorbent substrate for encasement of an electrical power cable or other household item therein. The absorbent substrate is impregnated during manufacture with a non-toxic pet repellent which provides a foul taste to the pet when attempting to chew thereon. In this manner, the pet may be effectively trained away from the negative habit of chewing on household items thus protecting these household items from damage and alleviating the owner's potential discontent with the family pet.

There are several methods known to those skilled in the art of impregnating substrates such as thermoplastic compositions with a herbal extract or the like type additive. One such method is disclosed in U.S. Pat. No. 4,513,014 to Edwards wherein an aromatic extract which is essentially insoluble in the polyurethane thermoplastic is admixed either during initial formulation or after granulation thereof in preparation for the final molding operation. U.S. Pat. No. 3,871,334 to Axelrod discloses a method of impregnating a nylon type thermoplastic with flavor and odor components via a cooking vessel to elevate the temperature and pressure therein until impregnation is achieved. U.S. Pat. No. 6,200,616 to Axelrod discloses a polyester polyurethane type thermoplastic which is capable of absorbing higher levels of water-based flavor or odor based extracts than conventional polyurethane or nylon thermoplastic materials. Although none of these devices teach or suggest a device to repel pets therefrom, they all describe valid methods of imparting chemical or herbal extracts and their relevant properties into various types of thermoplastic materials. Therefore, those skilled in the art will appreciate that any type of thermoplastic material, which allows for the dispersal of a non-toxic pet repellent substance therein, may be used in accordance with the present invention for the purpose of harmlessly warding away pets from household items. Moreover, it is to be understood that the non-toxic pet repellent, which is to form a component of the present invention, may be embodied in various forms including particulate matter such as powders, or crushed chips, aqueous-based solutions, oil-based solutions, and the like. Preferably, one embodiment of the present invention utilizes an oil-based solution which is admixed into a two component polyurethane thermoplastic material during the molding stage. The oil-based pet repellent provides advantage by being substantially void of water, the addition thereof which would otherwise cause the polyurethane material to foam during the curing process.

One aspect of the present invention is the use of an absorbent substrate such as fabric, or thermoplastic into which a pet repellent is impregnated for the purpose of harmlessly warding away pets from household items. It is well known in the art that various chemical additives may be impregnated into thermoplastic molded devices during their manufacture. Therefore, one embodiment of the present invention describes an absorbent substrate defined by a plastic sheath which is easily wrapped around electrical power cables, or even legs of chairs or tables for the protection thereof. Alternative embodiments contemplate the use of an absorbent substrate defined by a non-toxic pet repellent impregnated fabric as well as a tape-like structure which is releasably attachable to virtually any household item.

Another aspect of the present invention is the ability to provide pet deterring means to any household item having long serviceable life thus obviating the need to periodically re-apply liquid based pet deterrent solutions. House pets do not maliciously intend to damage household items; their chewing habit is merely an instinctual trait from which the pet must be trained to understand unacceptable chewing behavior. For dog owners raising a young dog through its teething stage, securing all-important household items therefrom can be an insurmountable task. The present invention therefore provides a system for the protection of household items which essentially only requires only one application thereto.

It is therefore an object of the present invention to provide a non-toxic pet deterrent device for the protection of various household items such as electrical power cords, legs of tables and chairs, and the like from the chewing action of any household pet.

It is a further object of the present invention to provide a pet deterrent device comprising of a sheath which is impregnated with a non-toxic pet repellent for the protection of various household items such as electrical power cords, legs of tables and chairs, and the like from the chewing action of any household pet.

It is a further object of the present invention to provide a pet deterrent device comprising a tape-like absorbent substrate having a layer of pressure sensitive adhesive on its surface for easy application to the surface of any household item, thereby providing protection from the chewing action of any household pet.

Another object of the present invention is to provide a pet deterrent device that is easily adapted for use on any household item for which the protection from the chewing action of any household pet is desired.

Another object of the present invention is to provide a pet deterrent device that is inexpensive to produce as well as easy to use by any user.

These and other objects will become readily apparent to those familiar with the construction and use of pet devices and will become apparent in the following portions of the specification, wherein the detailed description is for the purpose of fully disclosing preferred embodiments of the invention without placing limitations thereon.

BRIEF DESCRIPTION OF THE DRAWINGS

For a more complete understanding of the present invention, and the advantages thereof, reference is now made to the following descriptions taken in conjunction with the accompanying drawings in which.

DETAILED DESCRIPTION OF THE PREFERRED EMBODIMENTS

Figure 1:
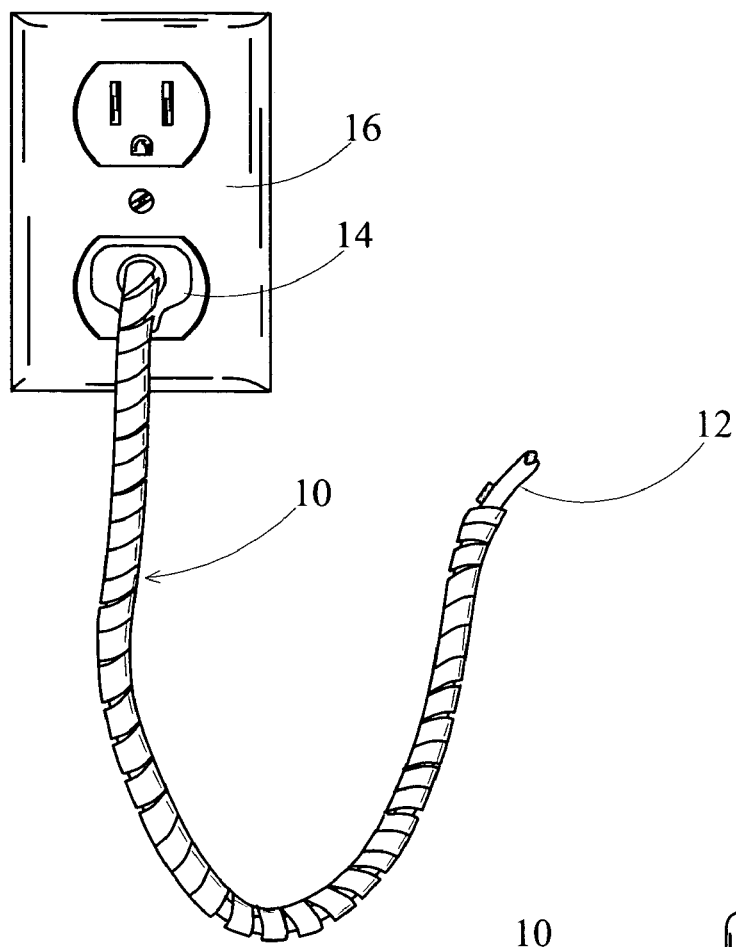
FIG. 1 is one preferred embodiment of the present invention shown in operative engagement encasing a section of an electrical power cord which is plugged into a typical wall socket.
Figure 2:
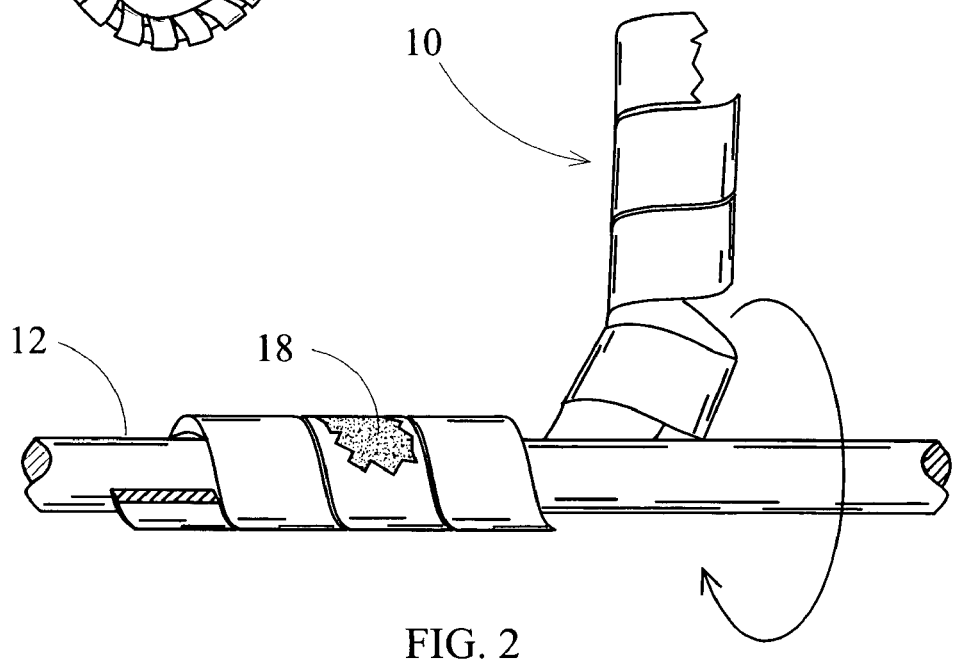
FIG. 2 is a partial enlarged view of the embodiment of FIG. 1, illustrating the preferred manner of applying the pet deterrent device to a section of electrical power cord. A portion of the outer surface is shown cut away to reveal the pet repellent substance impregnated therein.

Referring now to the drawings, FIGS. 1-5 represent several embodiments and designs of a pet deterrent device used for the purpose of harmlessly warding away pets from household items. Each of the various designs, however, utilize the unitary novel feature of a substrate means, which is releasably attachable proximate to virtually any household item, and is impregnatable with a non-toxic pet repellent substance. As shown in FIGS. 1 and 2, one embodiment of the present invention shows a pet deterrent device 10 in operative engagement encasing a section of electrical power cord 12 having a plug 14 which is inserted into a typical wall outlet 16. The pet deterrent device 10 generally comprises a substrate means defined by a plastic strip defining a solid rectangular cross-section shaped into a helical form. The plastic strip is resilient and flexible thus allowing the power cord 12 to be easily flexed to and fro without substantial deformation from its helical shape. The pet deterrent device of the present invention 10 has a pet deterring substance 18 impregnated thereinto (to be described later) to ward away house pets. Therefore, house pets having a chewing disposition receive a foul taste when biting on the electrical cord/pet deterrent device assembly and thus are trained to stay away therefrom. Although FIG. 1 shows an application of the pet deterrent device 10 operatively engaged on a conventional electrical power cord, it is well known in the art that the present invention 10 may also be used on other household items such as computer cables, legs of furniture, family heirlooms, and the like. Additionally, the present embodiment describes the use of a substantially elongated section of helically-shaped thermoplastic material; however, it is to be appreciated that any physical shape may be realized that enables the releasable attachment to a household item for protection from common household pets.

The plastic strip defining the substrate means may be formed of any thermoplastic material such as polyurethane, nylon, and the like having an ability to be impregnated with a non-toxic pet repellent 18. Although there are several types of thermoplastic materials, which are well known in the art to provide this capability, polyurethane is preferred due to its flexibility as well as its resistance to tearing. Thus the plastic strip may be formed from any suitable thermoplastic material, preferably polyurethane, having a hardness from 90 shore A to 80 shore D as measure by ASTM (American Society for Testing and Materials), and most preferably between 40 shore D to 70 shore D. Polyurethane compositions falling within the above ranges will provide the necessary flexibility as well as to resist normal tearing forces from a chewing animal.

It is well known in the art that various additives may be impregnated into thermoplastic molded devices during their manufacture. For example, there are several known processes for impregnating particulate matter such as powders, or crushed chips, aqueous-based solutions, or oil-based solutions into thermoplastic materials; any of the aforementioned processes which impregnates a non-toxic pet repellent substance into a thermoplastic substrate for use within a home environment on common household pets being within the scope of the present invention. However, the preferred process for evenly dispersing the pet repellent 18 in a thermoplastic material is disclosed in U.S. Pat. No. 4,513,014 to Edwards, issued on Apr. 23, 1985 which describes a means to impregnate a polyurethane object with an aromatic or flavorful substance, is hereby incorporated by reference. The present invention however, differs from the '014 disclosure in that the substance to be dispersed is a non-toxic, foul tasting substance to a pet rather than a pleasing, attractive one. The ratio of pet repellent to polyurethane can be varied to any amount which causes a sufficient amount thereof to be released into the pet's mouth upon chewing in order to cause a repelling action. Thus this ratio can be varied within wide limits depending upon the relative repugnance of the type of pet repellent as well as the type of polyurethane used, by weight from 0.1% to 25%. For a preferred pet repellent such as bitter apple or capsaicin extract, about 1% to about 10% would be adequate.

In one preferred method of impregnating a polyurethane substance with a pet repellent, polyurethane components consisting of EASYFLO™ polyurethane liquid plastic parts A and B, available from Polytek Development Corporation®, 55 Hilton Street, Easton, Pa. 18042, having a cured hardness of 65 shore D is used. Part B (polyol) is initially admixed with a predetermined amount of dehydrated bitter apple extract in proportion such that the bitter apple extract to polyurethane components Parts A and B is about 2% by weight. It is important that the bitter apple extract is substantially dehydrated in order to minimize foaming of the cured composition. Next, Part A (phenylisocyanate) is added to the mixture and the resulting composition is allowed to cure for at least 2 days at room temperature. After this time, the cured composition is ground into small particles and heated to a temperature between 350 to 425 degrees Fahrenheit at which point the glass transition temperature of the polyurethane particles has been exceeded and is subsequently formed using any conventional molding technique, preferably extruded into its final helical shape. In use, the pet deterrent device 10 is substantially elongated and must be cut to any desired length by a user using scissors or knife. The pet deterrent device 10 is installed along the length of the electrical power cord 12 using a circumferential wrapping action as shown in FIG. 2. The present embodiment describes a pet repellent impregnated thermoplastic composition which shaped into a helical form, however it is well known in the art that there are other geometrical forms of hardened thermoplastic/pet repellent compositions that may be used to encase household items.

An alternative method incorporates the injection or pouring of the thoroughly mixed polyol/pet deterrent/phenylisocyanate composition directly into its final shape via a commonly known process called reaction injection molding (RIM). This method is particularly useful with pet repellent substances whose important properties could become damaged when subjected to the relatively high glass transition temperatures necessary for molding polyurethane products. Using the RIM method, a predetermined amount of pet repellent substance is initially admixed with the Part B (polyol) such that the resulting proportion of repellent to polyurethane components Parts A and B provides sufficient repelling action to the animal. Next, Part A (phenylisocyanate) is admixed into the pet deterrent/Part B (polyol) mixture and then the resulting composition immediately molded to its final shape using any commonly known means including injection, or pouring.

EXAMPLE 1

In this example, a pet repellent was used that was a capsaicin extract available under the tradename 1 MILLION SCOVILLE PEPPER EXTRACT™ from Ashley food Company, Inc., Sudbury, Mass. Initially, 0.25 teaspoon of the pepper extract was mixed with 2.25 teaspoons of Part A (phenylisocyanate) of the EASYFLO™ polyurethane thermoplastic compound. Next, 2.25 teaspoons of Part B (polyol) was admixed into the phenylisocyanate and pepper extract mixture yielding a 5.5% pepper extract:polyurethane ratio, and poured into a bone-shaped mold and allowed to cure. As a control, other similar bone-shaped products were made using the EASYFLO™ two part polyurethane compound which were void of any pet deterrent substances. Subsequent tests on pets such as dogs revealed that pets consistently rejected the bone-shaped products that had pepper extract impregnated therein and readily accepted similarly manufactured bone-shaped products that had no pet deterrent substance impregnated therein. Even several months following manufacture of the test bones revealed that the dogs repeatedly rejected the extract impregnated bones in lieu of the bones having no extract impregnated therein.

EXAMPLE 2

The pet repellent defined by the capsaicin extract, 1 MILLION SCOVILLE PEPPER EXTRACT™ was again used to create several test specimens in a manner similar to the test bones as described in EXAMPLE 1, yet having higher concentrations of pepper extract impregnated therein. One set of test bones were constructed using 0.5 teaspoons of the extract which was admixed into the two part polyurethane EASYFLO™ composition in order to yield a proportion of pepper extract:polyurethane ratio of approximately 11%. Another set of test bones were constructed using 1.0 teaspoons of the pepper extract in order to yield a proportion of the pepper extract:polyurethane ratio of approximately 22%. Immediately following de-mold of the test bones comprised of approximately 11% pepper extract:polyurethane ratio, it was found that some of the extract perspired from the hardened polyurethane bone thus showing that maximum saturation of the pepper extract in the polyurethane matrix had been exceeded. Similarly, following de-mold of the test bones comprised of approximately 22% pepper extract:polyurethane ratio, it was found that a relatively higher amount of pepper extract had immediately perspired from the polyurethane bone material thus confirming the earlier conclusion. Moreover, it was noted that test bones created with relatively higher concentrations pepper extract tended to be relatively more pliable as well as to exhibit a relatively higher level of olfactory repugnance. Tests of these bones on pets again concluded that the pets repeatedly refused these test bones in lieu of other bones having no pet repellent impregnated therein.

An alternate embodiment 30 of the present invention contemplates a substrate means existing as a cylindrically shaped, generally absorbent, elastic fabric 32 which is impregnated with a pet repellent substance 34. The fabric may be any known type which is expandable and absorbent, preferably comprising an expandable cotton/spandex knit fabric. The pet deterrent device 30 is formed from a substantially elongated section of fabric 32 having two side edges defining the width thereof. The fabric piece is folded is folded onto itself along said width and the two side edges are sewn together using conventional sewing techniques thus forming a seam 36 which is substantially perpendicular to the width thereof. Thus the substantially elongated section of fabric is formed into a cylinder shape defining an inner cavity 38 whose diameter is essentially 0.318 (1/Pi) times the width thereof, minus any overlap required due to the sewing operation. The fabric 32 is at least stretchable along its width in order to be stretchingly applied over any elongated household item such as electrical power cords or a leg of a piece of furniture. The fabric 32 may be impregnated with any pet repellent substance 34, preferably by immersion in an aqueous solution of water, isopropyl alcohol, and bitter apple extract. Following immersion, the fabric 32 is left to completely dry leaving only the bitter apple extract impregnated within the fibers of the fabric matrix. The concentration of extract can be varied to any amount which causes a sufficient repelling action of the pet due to the chewing thereon. Thus, the ratio of pet repellent to fabric material can be varied within wide limits depending upon the relative repugnance thereof, for the preferred pet repellent such as bitter apple, about 0.05% to about 5% would be adequate.

Figure 3:
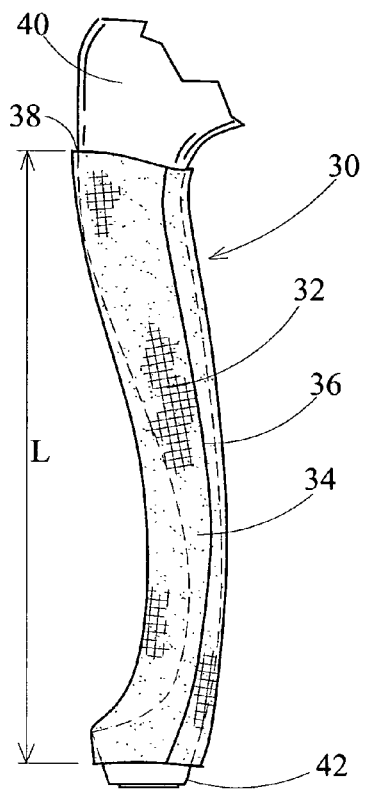
FIG. 3 is an alternative embodiment of the present invention having an absorbent substrate which is made of expandable fabric shown in operative engagement encasing the leg of a typical chair.

The present embodiment 30 is shown in FIG. 3 encasing the leg of a conventional wooden chair 40, however it is to be understood that any household item may be protected from the chewing action of a pet by its use thereon. In use, the pet deterrent device 30 is substantially elongated and must be cut to length L using scissors or knife. Next, the device 30 is applied to the chair leg 40 by inserting the terminal end 42 of the leg into the inner cavity 38 of the device 30 and pulling thereon until the entire length L of device 30 is applied thereon. The resiliency of the elastic fabric 32 creates a snug fit over the chair leg 40 thus maintaining the device 30 at its desired position thereon during normal handling conditions.

Figure 4:
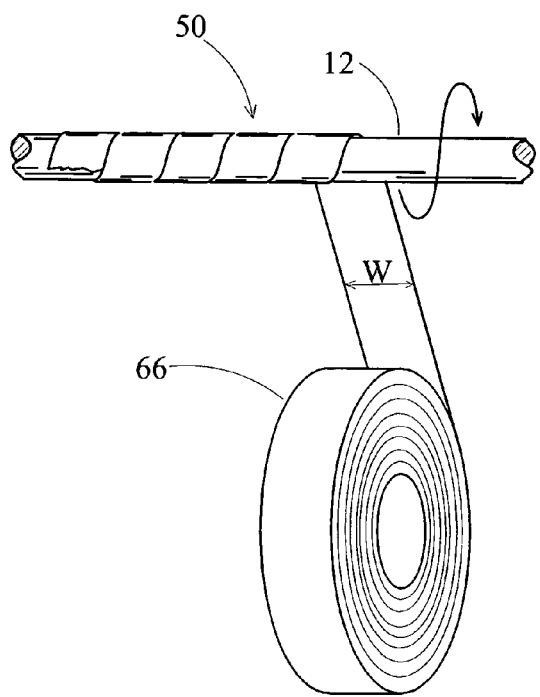
FIG. 4 is another alternative embodiment of the present invention having a substantially elongated absorbent substrate which has a layer of pressure sensitive adhesive disposed thereon showing the preferred manner of applying to a section of electrical power cord.
Figure 5:
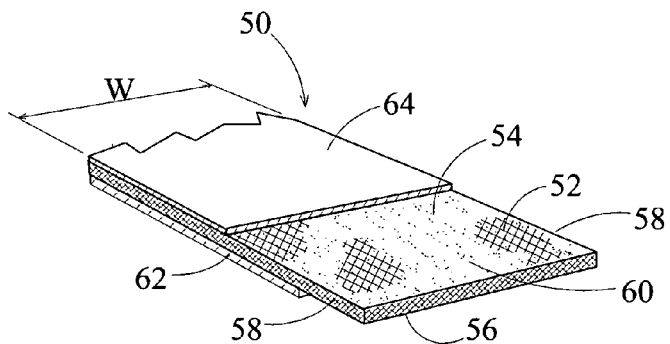
FIG. 5 is a partial enlarged view of the embodiment of FIG. 4 showing the arrangement of layers thereof.

Another alternative embodiment 50 of the present invention is shown in FIGS. 4 and 5 in which the substrate means is an absorbent fabric 52 having releasable adhering means for releasable attachment to any household item. The absorbent fabric 52 is generally sheet-like in shape and is substantially elongated in length having an upper surface 54, lower surface 56, and two side edges 58 whose distance therebetween defines the width W thereof. The fabric backing 52 is impregnated with a non-toxic pet repellent, preferably dehydrated bitter apple 60 and has a layer of removable pressure sensitive adhesive 62 permanently bonded to the lower surface 56. The fabric backing 52 may be made of any sheet-like, flexible material, preferably conventional woven denim, which is flexible and absorbent. Optionally, a small amount of conventional acrylic adhesive may be sprayed onto the fibers of the fabric in order to strengthen the weave structure as well as reduce fringing of the side edges 58. The pressure sensitive adhesive layer 62 may be of any known formulation which allows releasable adherement to any household item, preferably an acrylic emulsion such as part number SE5398NA available from H. B. FULLER COMPANY, St. Paul, Minn. The pet repellent 60 is impregnated into the fabric 52 by spraying an aqueous solution of water, isopropyl alcohol, and bitter apple extract thereon and allowing to dry completely. The concentration of pet repellent can be varied to any amount which causes a sufficient repelling action of the pet due to the chewing thereon. Thus, the ratio of repellent to fabric material can be varied within wide limits depending upon the relative repugnance thereof. For the preferred pet repellent such as bitter apple, about 0.05% to about 5% would be adequate. A substantially elongated piece of the pet repellent device 50 may be provided in a roll 66 as shown in FIG. 4. In order to insure a light releasable bond of the pressure sensitive adhesive layer 62, a thin layer of release material 64, preferably silicone is disposed on the upper surface 54 prior to forming into a roll 66. The device 50 may be applied to any household item by peeling away a desired section thereof from the roll 66 and applying to the household item via contact therewith the pressure sensitive adhesive layer 62. Finally, the desired section may then be severed from the roll using scissors or knife. FIG. 4 shows the preferred method for applying the pet deterrent device 50 to an electrical power cord 12 wherein a section thereof is peeled from the roll 66 while simultaneously being applied to the cord 12 in a spiraling fashion.

The present invention may be embodied in other specific forms without departing from the spirit or scope of the invention. For example, it is contemplated that the tape-like structure of the embodiment of FIGS. 4 and 5 may also be realized using a substrate means formed from a thin layer of flexible thermoplastic such as a vinyl based substance, wherein the thermoplastic substrate is impregnated with a pet repellent as described in the embodiment of FIGS. 1 and 2 and formed into its final shape using common extrusion techniques. Thus, the described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

I claim:

1. A pet deterrent device for repelling pets from a household item, said pet deterrent device comprising:
   an aqueous based non-toxic pet repellent for training pets away from the negative behavior of chewing on said household item, said pet repellent being dispersed in;
   a substrate means which a flexible, generally absorbent fabric having substantially elongate length defining an upper surface and a lower surface, said fabric is impregnated with said repellent, said substrate means fabric is adapted to be releasable applied to the surface of a household item, said lower surface has a layer of pressure sensitive adhesive attached thereto and said upper surface has a release layer attached thereto, whereby said fabric may be releasably attached to said household item via contact with said pressure sensitive adhesive layer.

2. The pet deterrent device of claim 1, wherein said pet repellent is a chemical formulation selected form the list consisting of bitter apple, capsaicin, methyl nonyl ketone, naphthalene, nicotine, ropel, thiram, oil of mustard, oil of anise, thymoil, and peppermint oil.

3. The pet deterrent device of claim 1, wherein said substrate means is molded from a single piece of thermoplastic material.

4. The pet deterrent device of claim 3, wherein said thermoplastic material is polyurethane.

5. The pet deterrent device of claim 3 wherein said substrate means comprises a substantially elongated plastic strip defining a solid rectangular cross-section shaped into a helical form, whereby said plastic strip is adapted to encase said household item.

6. The pet deterrent device of claim 1, wherein said substrate means is a flexible, generally absorbent, elastic fabric having substantially elongated length and having two side edges defining the width thereof, said two side edges are attached to each other in order to form a cylinder shape defining an inner cavity, said elastic fabric being expandable at least along the width thereof whereby said pet deterrent device is adapted to encase said household item within said inner cavity.

7. A pet deterrent for repelling pets from a household item, said pet deterrent device comprising:
   a non-toxic aqueous based pet repellent for training pets away from the negative behavior of chewing on said household item, said pet repellent being dispersed in;
   a generally absorbent fabric material which is impregnated with repellent, said fabric material being adapted to be releasably applied to the surface of a household item, thereby protecting household items form the potential damage caused by the instinctive hewing action of said pet.

8. The pet deterrent device of claim 7, wherein said fabric material is elastic in order to allow said device to be stretchingly applied over said household item.

9. The pet deterrent device of claim 8, wherein said elastic fabric material has substantially elongated length and has two sides edges defining the width thereof, said two side edges are attached to each other in order to form a cylinder shape defining an inner cavity, said elastic fabric being expandable at least along the width thereof whereby said pet deterrent device is adapted to encase said household item within said inner cavity.

10. The pet deterrent device of claim 7, wherein said fabric material has substantially elongate length defining an upper surface and a lower surface, said lower surface has a layer of pressure sensitive adhesive attached thereto and said upper surface has a release layer attached thereto, whereby said fabric material may be releasably attached to said household item via contact with said pressure sensitive adhesive layer.

11. A pet deterrent device for repelling pets from a household item, said pet deterrent device comprising:
   a non-toxic aqueous based pet repellent for training pets away from the negative behavior of chewing on said household item, said pet repellent being dispersed in a thermoplastic material which is impregnated with said repellent, said thermoplastic material has substantially elongate length defining an upper surface and a lower surface, said lower surface has a layer of pressure sensitive adhesive attached thereto, whereby said pet deterrent device defines a tape-like substance which may be releasably attached to said household item via contact with said pressure sensitive adhesive layer.

12. The pet deterrent device of claim 11, comprising the product of impregnating said thermoplastic material with said non-toxic pet repellent, wherein said pet repellent is substantially free of any water content.

13. The pet deterrent device of claim 11 comprising the product of impregnating said thermoplastic material with said non-toxic pet repellant, wherein said pet repellant is admixed into said thermoplastic material prior to the polymerization thereof.

14. The pet deterrent device of claim 13, wherein said thermoplastic material is formed into its final shape using a reaction injection molding process.

15. The pet deterrent device of claim 11, wherein said thermoplastic material comprises a substantially elongated plastic strip defining a solid rectangular cross-section shaped into a helical form, whereby said plastic strip is adapted to removably encase said household item.

16. A method for repelling common household pets away from common household items comprising the steps of:
   providing a pet deterrent device comprising a non-toxic aqueous based pet repellent for training pets away from the negative behavior of chewing on said household items, said pet repellant being dispersed in a single piece of flexible fabric which is impregnated with said repellant; and,
   applying said pet deterrent device to said household item in a manner such that removal of said device from said household item is easily accomplished.

17. The method of claim 16, wherein said non-toxic pet repellent is a chemical formulation selected from the list consisting of bitter apple, capsaicin, methyl nonyl ketone, naphthalene, nicotine, ropel, thiram, oil of mustard, oil of anise, thymoil, and peppermint oil.

18. The pet deterrent device of claim 16, wherein said substrate means is molded from a single piece of thermoplastic material.

* * * * *